US012669289B2

(12) United States Patent
Linnot et al.

(10) Patent No.: US 12,669,289 B2
(45) Date of Patent: Jun. 30, 2026

(54) METHOD FOR REPAIRING A TANK IN A GLASS MELTING FURNACE

(71) Applicant: SAINT-GOBAIN CENTRE DE RECHERCHES ET D-ETUDES EUROPEEN, Courbevoie (FR)

(72) Inventors: Cyril Linnot, Lyons (FR); Thierry Claude Consales, Pernes les Fontains (FR); Thibault Champion, Villelaure (FR)

(73) Assignee: SAINT-GOBAIN CENTRE DE RECHERCHES ET D-ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 18/284,528

(22) PCT Filed: Mar. 28, 2022

(86) PCT No.: PCT/EP2022/058126
§ 371 (c)(1),
(2) Date: Sep. 27, 2023

(87) PCT Pub. No.: WO2022/207555
PCT Pub. Date: Oct. 6, 2022

(65) Prior Publication Data
US 2025/0093103 A1 Mar. 20, 2025

(30) Foreign Application Priority Data
Mar. 29, 2021 (FR) ........................................ 2103200

(51) Int. Cl.
F27D 1/16 (2006.01)
C03B 5/43 (2006.01)

(52) U.S. Cl.
CPC .............. *F27D 1/1636* (2013.01); *C03B 5/43* (2013.01); *F27D 2001/161* (2013.01)

(58) Field of Classification Search
CPC .... F27D 1/1636; F27D 2001/161; C03B 5/43
See application file for complete search history.

(56) References Cited

U.S. PATENT DOCUMENTS

2018/0237344 A1* 8/2018 Cabodi ................. C04B 35/634

FOREIGN PATENT DOCUMENTS

EP 0739861 10/1996

OTHER PUBLICATIONS

French Search Report dated Nov. 29, 2021.
(Continued)

*Primary Examiner* — Nathan T Leong
(74) *Attorney, Agent, or Firm* — IPSILON USA, LLP

(57) ABSTRACT

The invention relates to a method for repairing, in a hot state, a region of a tank in a glass furnace, referred to as the "region to be repaired", by means of a repair product (P), the method involving the following steps, at a temperature greater than 300° C.: a) defining a receiving space in the region to be repaired, referred to as the "region to be filled", the region to be filled (10) having a bottom (12; 12'); b) coating the bottom, the coating time, from the start of the introduction of the repair product into the region to be filled to the time at which the bottom is completely covered with the repair product, lasting less than 14 minutes; c) filling the region to be filled with the repair product, the rate of increase (V) in the repair product in the region to be filled being, at any time during the filling step, greater than or equal to 3 mm/min.

17 Claims, 1 Drawing Sheet

(56) References Cited

OTHER PUBLICATIONS

International Search Report and Written Opinion Dated Jun. 27, 2022.
Sanchez Franco et al. "Hot Bottom Repairs: Global Impact, Performance Case Study and Development for the Americas" 74th Conference on Glass Problems: Sundaram/74th Conference. Apr. 28, 2014.

* cited by examiner

[Fig 1]
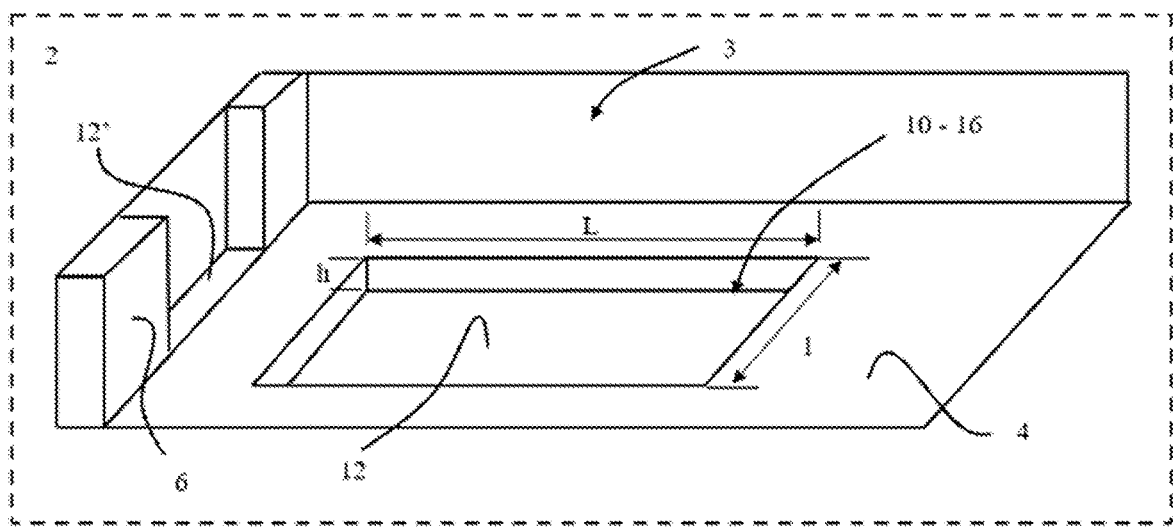
[Fig 2]
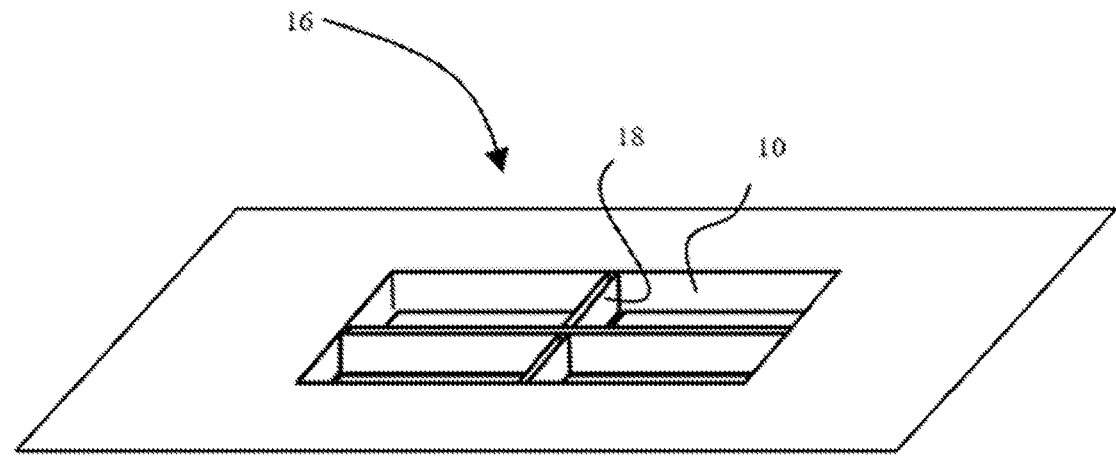
[Fig 3]
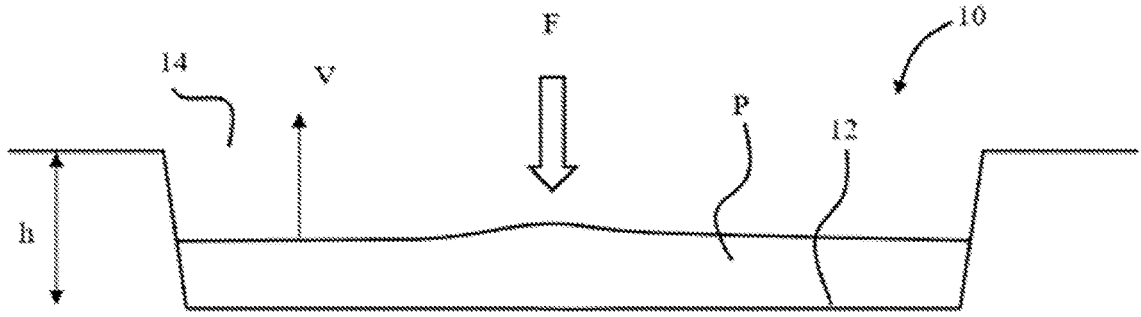

METHOD FOR REPAIRING A TANK IN A GLASS MELTING FURNACE

RELATED APPLICATION

This application is a National Phase of PCT/EP2022/058126 filed on Mar. 28, 2022, which claims the benefit of priority from French Patent Application No. 21 03200, filed on Mar. 29, 2021, the entirety of which are incorporated by reference.

TECHNICAL FIELD

The present invention pertains to a method for repairing a tank of a glass-melting furnace.

PRIOR ART

To construct its furnaces, the glass industry generally makes use of refractory products which are melted and cast, or are obtained by sintering, which are highly resistant to corrosion by the molten glass and take the form of blocks or slabs.

The molten glass is highly corrosive, and the refractory products, especially those forming the melting tank, are subject to substantial wear, possibly leading to leakages of molten glass. These leakages are dangerous and may result in stoppage of the furnace.

In order to increase furnace lifetime, the glassmaker may have to carry out hot repairs. A hot repair advantageously allows the time for which furnace operation is interrupted to be limited substantially.

EP 3 268 328 B1 describes a product for repairing glass-melting furnaces and also a method for hot repair of a region of a glass-melting furnace, more particularly the floor.

EP 0 739 861 B1 also describes a method for repairing glass-melting furnaces. According to this method, layers of a repair product are superposed in the target filling regions.

Furthermore, products are also used for repairing metal-producing furnaces. The mechanical stresses in that application, however, are very different from those encountered in application to a glassmaking furnace. The conditions under which the furnaces are corroded by a glass or by a metal in molten form are also very different. Lastly, certain impurities, which are tolerated in the metal-producing furnaces, are unacceptable for the manufacture of glass. More particularly, the refractory materials used in the glassmaking furnaces must not give rise to release of stones by fragmentation, nor produce bubbles. A repair product intended for a metal-producing furnace is therefore not, in principle, suitable for use for a glassmaking furnace, especially in a zone in contact with the molten glass.

With the current methods, the region repaired remains fragile. The lifetime of the tank is therefore limited.

There exists, accordingly, an ongoing need for solutions allowing the life of the repaired tank to be extended. The present invention aims to meet this need at least partially.

SUMMARY OF THE INVENTION

The invention provides a method for hot repairing of a region of a tank of a glassmaking furnace, referred to as "target repair region", by means of a repair product, said method comprising the following steps, at a temperature greater than 300° C., preferably greater than 400° C., preferably greater than 500° C., preferably greater than 600°

C., preferably greater than 700° C., preferably greater than 800° C., preferably greater than 900° C., and preferably less than 1350° C., preferably less than 1300° C.:

a) defining a receiving space in the target repair region, referred to as "target filling region", the target filling region comprising a bottom;

b) coating said bottom, the duration of coating, from the start of the introduction of the repair product into the target filling region to the moment when said bottom is completely covered by repair product, being less than 14 minutes;

c) filling, preferably by casting, the target filling region with the repair product, the rise velocity of the repair product in the target filling region being, at any moment during said filling step, greater than or equal to 3 mm/min.

In step c), any unit volume of the target filling region under consideration, for example any cubic volume with a 1 cm side, is therefore filled at a rise velocity of greater than or equal to 3 mm/min.

As will be seen in more detail in the remainder of the description, the repair method according to the invention makes it possible, surprisingly, to extend the lifetime of the region of the tank repaired. More particularly, the inventors have found that a thus-controlled rise velocity and coating duration endow the repaired region with a lower open porosity and a higher mechanical strength, particularly compressive strength, than with the prior methods. They have also found that the microstructure of the region repaired by a method according to the invention is devoid of strata, this possibly explaining the performance levels obtained.

In the interest of clarity, a distinction is made between the region of the furnace that needs to be repaired, or "target repair region" and the region which, in the filling step, is filled in a controlled manner, in other words the "target filling region". The reason is that although, in one embodiment, the target filling region coincides with the target repair region, the target repair region may alternatively be partitioned so as to define a plurality of target filling regions with smaller surface areas.

A method according to the invention may also comprise one or more of the following optional and preferred features:

the rise velocity varies, during said filling step, between a minimum velocity and a maximum velocity, the difference between said maximum rise velocity and minimum rise velocity being less than 15 mm/min;

the rise velocity of the repair product is, at any moment during said filling step, greater than 7 mm/min, preferably greater than 12 mm/min, and/or less than 80 mm/min;

the duration of the coating step is preferably less than 10 minutes, preferably less than 8 minutes;

the target filling region has a surface area of less than or equal to 25 m², preferably less than 16 m², and/or a surface area of greater than or equal to 3 m²;

in step b) and/or in step c), preferably in step b) and in step c), the repair product is introduced into the target filling region at a rate of greater than 0.02 m³/min and less than 0.60 m³/min;

during the filling step c), the repair product is conveyed to the target filling region by pumping, preferably with a suction pressure of less than or equal to 180 bar;

the target filling region is defined by the surface of the tank in the target repair region and/or by one or more compartmentalization walls emplaced in the target repair region;

the compartmentalization walls define, alone or in combination with the surface of the tank in the target repair region, a target filling region included in the target repair region;

in step a), the target repair region is divided into a plurality of compartments, the target filling region being one of said compartments;

the method comprises a plurality of cycles of steps b) and c) so as to fill each of said compartments, each compartment constituting one said target filling region.

The invention also concerns a method for hot repairing a tank initially containing a molten glass bath in contact with the target repair region, comprising the following steps:

1) at least partially draining said molten glass from the tank, in order to expose said target repair region;

2) preferably, rinsing said target repair region;

3) reducing the temperature in the furnace;

4) implementing steps a) to c);

5) preferably, increasing and maintaining the temperature of the furnace between 900° C. and 1400° C. so as to sinter the repair product;

6) introducing a glass composition for melting into the tank and increasing the temperature of the furnace to an operating temperature leading to the melting of said composition.

The invention also concerns a glass-melting furnace comprising a tank comprising at least one region repaired, preferably repaired by a method according to the invention, said repaired region being made of a product, preferably a sintered product, having a non-stratified microstructure.

The product in the repaired region is preferably sintered. The sintered product in the repaired region preferably has:

an open porosity of less than 40%, preferably less than 35%, preferably less than 30%, and/or a cold compressive strength of greater than 30 MPa, preferably greater than 40 MPa, preferably greater than 50 MPa, preferably greater than 55 MPa.

BRIEF DESCRIPTION OF THE FIGURES

Other features and advantages of the invention will also become apparent on scrutiny of the description which now follows and in relation to the attached drawing, in which:

FIG. 1 represents schematically, in perspective, a tank having two target repair regions;

FIG. 2 represents schematically, in perspective, a compartmentalized target repair region;

FIG. 3 represents schematically a target filling region undergoing filling.

DEFINITIONS

In the interest of clarity, a distinction is made between the "repair product", which is the product installed in the filling step, and the "sintered product", which is the product resulting from sintering of the repair product after the filling step.

The entity conventionally referred to as the "tank" of a glass-melting furnace is the assembly composed of the floor and the side walls, throat included, which is intended to be in contact with the molten glass when the raw materials are melted. The floor of the tank defines the substantially horizontal bottom of the tank, and the side walls, which are substantially vertical, surround the bottom.

The side walls of the tank and/or compartmentalization walls which are installed on the floor may delimit the extent of the bottom of the target filling region.

The length and the width of the target filling region are considered to be the major axis and the minor axis of the largest ellipse that can be included in the interior opening (that is, the opening which opens towards the interior of the tank) of the target filling region. The depth is the largest dimension measured perpendicularly to said interior opening.

"Surface of the target filling region" refers to the surface of the bottom of the target filling region. For example, as illustrated in FIG. 1, if the target filling region 10 is a depression having the general shape of a rectangular parallelepiped and having a length L, a width l and a depth h, the surface of the target filling region is equal to the product L*l.

As illustrated in FIG. 3, the rise velocity V is the velocity, measured in the vertical direction, at which the repair product P fills the target filling region 10.

When the target filling region has a horizontal bottom 12 or 12', the rise velocity is therefore measured perpendicularly to the bottom. In FIG. 3, the arrow F illustrates the arrival of the repair product P in the target filling region.

"Coating" is a step prior to the filling step.

Coating commences at the start of the introduction of the repair product into the target filling region and ends at the moment when the bottom of the target filling region is for the first time completely covered with repair product. More particularly, when the repair product is self-flowable, it is conventionally introduced into the target filling region by means of a lance, and then flows over the floor until reaching the side walls and/or the compartmentalization walls. It therefore gradually covers the entire bottom of the target filling region. The coating step is finished when the repair product, contained by the side walls and/or compartmentalization walls, covers all of the bottom of the target filling region and when it is therefore forced to rise in the target filling region, during the filling step.

If the bottom comprises one or more cavities, the filling of these cavities forms part of the coating step. Coating ends only when all of the surface of the repair product introduced into the target filling region begins to rise.

"Unshaped product" refers to a dry particulate mixture.

A particle "made of a material" or "of a material" is understood to mean a particle for which said material makes up more than 95%, more than 98%, preferably substantially 100% of its mass.

A hydraulic cement or "hydraulic binder" is a binder which, on activation, generates hydraulic setting and hardening.

A "refractory material" is understood to mean a material exhibiting a melting point of greater than 1500° C. This definition is commonly employed by the skilled person and is cited in "*Matériaux réfractaires et céramiques techniques (éléments de céramurgie et de technologie)*", [Engineering refractory and ceramic materials (ceramurgy and technology components)], G. Aliprandi, published by Septima Paris, 1979. On pages 297 to 301, this work also gives examples of refractory materials, particularly oxides, carbides and nitrides.

The "glass" of the particles (b) referred to in the description hereinafter is a noncrystalline material exhibiting a glass transition temperature of less than 1100° C. The "glass transition temperature" of a glass is understood to mean the temperature at which the material passes from the solid state to the viscous state. The glass transition temperature may be determined by differential thermal analysis (DTA). The glass transition temperature is the temperature at which the glass exhibits a viscosity substantially equal to $10^{12}$ P.a.s. A glass is conventionally regarded as "in the solid state" at a temperature lower than its glass transition temperature. Similarly, as is well known, a glass-ceramic is regarded as "in the solid state" when it is at a temperature lower than the glass transition temperature of its residual glassy phase.

A "hot binder" is understood to mean a constituent exhibiting a melting point of greater than 600° C. and capable of bonding particles together, after hardening under the effect of a drop in the temperature, more particularly particles (a), described below, with which it has been mixed.

A "glass-ceramic" or "glass-ceramic material" is understood conventionally to mean a microcrystalline compound obtained by controlled crystallization of a "glass-ceramic precursor glass". The controlled crystallization of a glass-ceramic precursor glass takes place conventionally during a step following, immediately or otherwise, the step of obtaining said glass-ceramic precursor glass.

A glass-ceramic precursor glass is a glass in the solid state which, unlike other glasses, contains "nucleating agents". A nucleating agent is an agent capable of bringing about the formation of microcrystallizations or "microcrystallites" during the controlled crystallization heat treatment, commonly referred to as "crystallization heat treatment" or "glass-ceramization heat treatment", a microcrystallite being a crystal whose half-sum of the length and the width is less than 10 μm. The length and width of a microcrystallite are conventionally evaluated from sectional views of the glass-ceramic.

The microstructure of a glass-ceramic therefore consists of microcrystallites bathing in a residual glassy phase. The melting point of a glass-ceramic material is the equilibrium temperature separating the domain in which liquid and solid phases coexist from the domain where only a liquid phase is present. The products manufactured by melting and cooling, which, during their manufacture, do not transition via a step in which they are in the glass state, are therefore not glass-ceramic materials. Fused corundum, fused alumina, fused spinels, fused magnesia, fused mullite, fused mullite-zirconia, fused aluminum titanate, optionally doped, and fused nitrides are not, in particular, glass-ceramic materials.

"Maximum size" refers to the 99.5 percentile ($D_{99.5}$) of a powder, this percentile corresponding to the percentage by mass of 99.5%, on the cumulative particle size distribution curve of the powder, the particle sizes being classed in increasing order. The particle size distributions and the maximum size may be determined using a laser granulometer. The laser granulometer may be a Partica LA-950 from Horiba. It is clear that the particles having a size of less than 10 μm (and constituting the "<10 μm fraction") are counted in the fraction of particles having a size of less than 40 μm, that the particles having a size of less than 2 μm are counted in the fraction of particles having a size of less than 40 μm and in the fraction of particles having a size of less than 10 μm, etc.

"Impurities" are understood to mean the unavoidable constituents, introduced unintentionally and necessarily with the starting materials or resulting from reactions with these constituents. The impurities are merely tolerated, rather than necessary, constituents. With preference, the amount of the impurities is less than 2%, less than 1%, less than 0.5%, or even substantially zero.

"Self-flowable under hot conditions" refers to a repair product which is capable of spreading under its own inherent weight, and of filling the target filling region without leading to segregation, in a temperature range of between 300° C. and 1350° C. Segregation is considered to be present when the flow face of the product obtained after placement of the repair product and sintering exhibits a surface layer of milkiness which extends from said flow face over a depth of 3 mm or more. This surface layer of milkiness may easily be demonstrated after drying or sintering of the product, with sawing taking place in a plane perpendicular to the flow face.

AZS products are products, preferably electrofused products, whose principal constituents are alumina ($Al_2O_3$), zirconia ($ZrO_2$) and silica ($SiO_2$). In other words, alumina, zirconia and silica are the constituents having the highest contents by mass. These products are very suitable for the manufacture of glassmaking furnaces. More particularly, the current AZS products are used primarily for the regions in contact with the molten glass and also for the superstructure of the glassmaking furnaces. AZS products include, in particular, products sold by Saint-Gobain SEFPRO, such as ER-1681, ER-1685 or ER-1711.

When reference is made to $ZrO_2$ or to zirconia, it is appropriate to understand this as $ZrO_2$ and traces of $HfO_2$. The reason is that a little $HfO_2$, which is chemically indissociable from $ZrO_2$ in a melting process and which exhibits similar properties, is always present naturally in zirconia sources at levels of generally less than 2%. Hafnium oxide is not then considered to be an impurity. The $HfO_2$ content of the AZS particles is preferably less than 5%, less than 3%, less than 2%.

The term "fibers" refers to elongated structures, typically with a diameter of 1 μm to 1 mm and with a length of up to approximately 60 mm.

Unless otherwise indicated, all percentages are percentages by mass based on oxides. A content by mass of an element is expressed in the form of the most stable oxide.

"Contain" or "comprise" or "exhibit" or "have" should be interpreted nonlimitingly.

DETAILED DESCRIPTION

In step a), definition is given to the target filling region, which may be the target repair region or a part of the target repair region.

Target Repair/Filling Region

A method according to the invention is intended for repairing a part of a tank of a furnace containing molten glass. This part of the tank, or "target repair region", hence defines a volume that it is the object of the method to fill, in a controlled manner, with a repair product.

FIG. 1 represents, highly schematically, a furnace 2 comprising a tank 3 defined by a floor 4 and walls 6.

The target repair region may be contained in a wall or in the floor of the tank. With preference it is delimited principally by the floor.

The target repair region 16 may take the form of a continuous or blind cavity, for example of a depression region, resulting in particular from wear, which opens toward the interior of the tank via an interior opening.

When the target repair region crosses the tank, the opening via which it opens to the exterior of the tank is preferably shut off so as to allow the cavity to retain the repair product before the latter has sintered. This operation is conventionally referred to as "plating".

In one embodiment, particularly if the target repair region belongs to a wall of the tank, shuttering may be carried out in order to delimit at least one target filling region and to contain the repair product in the target filling region, after its placement. Any shuttering technique resistant to the temperature prevailing in the furnace during the repair may be used, in particular the use of metal plates cooled by water circulation, these plates being demounted after placement of the repair product.

As illustrated in FIG. 1, the target repair region 16 may coincide with the target filling region 10.

In another embodiment and as illustrated in FIG. 2, especially when the dimensions of the target repair region, the nature of the repair product and the equipment for conveying the repair product do not allow the desired rise velocity and coating duration to be attained, the target filling region 10 is delimited by means of one or more compartmentalization walls 18, which are preferably substantially vertical, emplaced in the furnace. These compartmentalization walls hence allow the surface area of the target filling region to be reduced and so, using the same equipment, allow the rise velocity to be increased and the duration of the coating step reduced.

Compartmentalization is particularly useful when the target filling region is at least partly defined by the floor.

The target filling region preferably has a surface area of greater than or equal to 3 m$^2$, preferably greater than or equal to 4 m$^2$, preferably greater than or equal to 5 m$^2$, preferably greater than equal to 6 m$^2$, preferably greater than or equal to 9 m$^2$, and preferably less than or equal to 25 m$^2$, preferably less than 16 m$^2$. Such surface areas are well-suited for allowing the filling according to the invention by implementation of the current technologies (pumps, lances) used for conveying the known repair products.

The depth h of the target filling region is not limiting. It is preferably greater than 1 cm, preferably greater than 2 cm, preferably greater than 3 cm, preferably greater than 5 cm and/or preferably less than 20 cm, preferably less than 15 cm.

Generally speaking, the dimensions and the shape of the target filling region may be as desired, provided that they allow for coating and filling under conditions in accordance with the invention.

The target repair region may be subdivided into multiple compartments, at least partly, preferably more than 50% of the compartments by number, and preferably each compartment preferably constituting a target filling region as defined above. The skilled person knows easily how to determine the number and the dimensions of the compartments for this purpose.

The floor of the glass-melting furnace preferably has at least two target filling regions, of which one has a surface area of greater than 3 m$^2$, preferably greater than 4 m$^2$.

The compartments may be manufactured by any techniques known to the skilled person. More particularly, for the floor, the compartments may be manufactured by arrangement of bricks made of a refractory material, more particularly an electrofused material, with a chemical composition preferably close to that of the repair product. The positioning of the bricks or of compartmentalization walls, preferably carried out outside the furnace, may be carried out, conventionally, manually, by means of cooled tools.

The partition walls 18 which delimit the compartments, made up of said bricks, for example, are preferably not withdrawn after the placement of the repair product.

In step b), the bottom of the target filling region is coated with the repair product.

Repair Product

The repair product P is preferably wet and preferably self-flowable under hot conditions.

The repair product is preferably the result of the moistening of an unshaped product. Said moistening may be performed by any known technique, for example in a kneader. The skilled person knows how to determine the amount of water to be used for moistening the unshaped product and obtaining the repair product.

In one preferred embodiment, particularly when the target filling region is located at the floor of the tank in the furnace, the unshaped product comprises A) particles (a) of at least one refractory material other than a glass and a glass-ceramic, and for which the main constituent or constituents are alumina, (Al$_2$O$_3$) and/or zirconia (ZrO$_2$) and/or silica (SiO$_2$) and/or chromium oxide (Cr$_2$O$_3$), the particles (a) making up the balance to 100%, B) 2% to 15% of particles (b) of a hot binder selected from glass-ceramic particles, particles of a glass, more particularly of a glass-ceramic precursor glass, and mixtures of these particles, the hot binder not being in the solid state at 1500° C., meaning that the hot binder is selected such that its glassy phase has a glass transition temperature of less than or equal to 1500° C., C) less than 2% of particles (c) of hydraulic cement, the total amount of particles (a), (b) and (c) being greater than 93% and less than or equal to 100%, as percentage by mass relative to the mass of the unshaped product, the entirety of said particles (a) and (b), preferably the entirety of the particles of the unshaped product, being distributed, as percentages by mass relative to the mass of the unshaped product, in the following manner:

fraction <0.5 μm: ≥1%,
fraction <2 μm: ≥4%,
fraction <10 μm: ≥13%,
fraction <40 μm: 25%-52%.

In a first main embodiment, the entirety of the particles (b) in the unshaped product comprises or even consists of glass particles.

In a second main embodiment, the entirety of the particles (b) in the unshaped product comprises or even consists of glass-ceramic particles and/or of glass-ceramic precursor glass particles.

The amount by mass of glass-ceramic particles and/or of glass-ceramic precursor glass particles in the entirety of the particles (b) in the unshaped product is preferably greater than 10%, preferably greater than 20%, preferably greater than 30%, preferably greater than 50%, preferably greater than 70%, or even greater than 90%, even greater than 95%, even substantially equal to 100%, based on the mass of the entirety of the particles (b).

The entirety of the particles (b) in the unshaped product preferably consists of glass particles and comprises glass-ceramic precursor glass particles. More preferably, the entirety of the particles (b) in the unshaped product consists of glass-ceramic precursor glass particles.

The unshaped product may preferably comprise one or more of the following features:

the particles (a) and (b), preferably the entirety of the particles in the unshaped product, are distributed in the following manner, as percentages by mass:

fraction <0.5 μm: ≤7%, preferably ≤6%, preferably ≤5%, and/or even ≥2%, and/or fraction <2 μm: ≥5%, preferably ≥6%, preferably ≥7% and/or preferably ≤18%, preferably ≤16%, preferably ≤14%, preferably ≤12%, and/or fraction <10 μm: ≥16%, preferably ≥19%, preferably ≥20% and/or preferably ≤40%, preferably ≤35%, preferably ≤33%, preferably ≤30%, preferably ≤28%, and/or fraction <40 μm: ≥27%, preferably ≥29%, preferably ≥30%, preferably ≥33%, preferably ≥35%, preferably ≥37% and/or preferably ≤50%, preferably ≤47%, preferably ≤45%, preferably ≤42%, and/or fraction of between 2 μm and 40 μm: ≥16% and/or ≤40%;

the maximum size of the entirety of the particles (a) and (b), preferably the maximum size of the entirety of the particles in the unshaped product, is less than or equal to 5 mm, preferably less than or equal to 2.5 mm, preferably less than or equal to 2 mm, or even less than or equal to 1.5 mm;

the entirety of the particles (a) and (b) with a size of less than 500 μm, preferably the entirety of the particles in the unshaped product with a size of less than 500 μm, represent more than 50%, preferably more than 55%, preferably more than 60%, preferably more than 65%, or even more than 70% of the mass of said unshaped product;

the amount of particles (a) in the unshaped product is greater than 82%, preferably greater than 85%, preferably greater than 91% and/or less than 98%, preferably less than 97%;

the entirety of the particles (a) preferably comprises, as percentages by mass based on the mass of the unshaped product:

a content of AZS particles of greater than 10%, greater than 20% and/or less than 95%; and/or a content of reactive alumina of greater than 2%, greater than 3%, greater than 4% and/or less than 13%, less than 10%, less than 8%; and/or a content of calcined alumina of greater than 5%, greater than 10%, and/or less than 38%, less than 35%; and/or a content of electrofused alumina of greater than 10%, greater than 20%, greater than 25%, and/or less than 70%, less than 65%; and/or particles exhibiting the following chemical analysis, as percentages by mass based on the oxides: $Cr_2O_3$+$Al_2O_3$+$ZrO_2$+$MgO$+$Fe_2O_3$+$SiO_2$+$TiO_2$≥90%, preferably ≥95%, and $Cr_2O_3$+$Al_2O_3$≥40%, or even ≥50%, or even ≥60%, or even ≥70%, or even ≥80%, or even ≥90%, or even, indeed, ≥95%, and $Cr_2O_3$≥9%, or even ≥15%, or even ≥20%, or even ≥29%, or even ≥39%, or even ≥49%, or even ≥59%, or even ≥70%, or even ≥80%, or even ≥90%, and 20%≥$SiO_2$≥0.5%, and other oxides: ≤10%, preferably ≤5%, the content of said particles being greater than 10%, greater than 20%, greater than 30% and/or less than 95%, and/or a content of pigmentary chromium oxide with greater than 5%, greater than 10%, and/or less than 25%, less than 20%;

the hot binder is selected so as not to be in the solid state at a temperature of 1350° C., preferably of 1300° C., preferably of 1250° C., preferably of 1200° C., preferably of 1150° C.;

the particles (b) represent more than 3% and less than 13%, preferably less than 12%, preferably less than 10%, preferably less than 9%, preferably less than 8% of the mass of said unshaped product;

the particles (b) of the product are distributed preferably in the following manner, as percentages by mass based on the mass of the particles (b):

fraction ≤1 mm: ≥80%, preferably ≥90%, or even ≥95%, or even substantially 100%, and/or fraction ≤0.5 mm: ≥80%, preferably ≥90%, and/or fraction ≤0.1 mm: ≥25% and/or ≤48%, preferably ≤45%, and/or fraction ≤0.04 mm: ≤30%, preferably ≤25%, or even ≤20%;

the particles (b) preferably exhibit a melting point of greater than 750° C., preferably greater than 800° C., preferably greater than 900° C., and/or less than 1650° C., preferably less than 1600° C., preferably less than 1550° C., or even less than 1500° C.;

the chemical composition of the particles (b) is selected such that their melting point is lower than the temperature of the target filling region;

in one embodiment, the particles (b) exhibit substantially the same composition as the molten glass in the furnace to be repaired;

the particles (b) preferably consist of a material for which the chemical composition comprises more than 90%, preferably more than 94%, preferably more than 97% of oxides;

in one embodiment, said material consists substantially entirely of oxides;

the particles (b) consist of a material for which the chemical composition comprises more than 45%, preferably more than 50%, preferably more than 55% and/or less than 80%, preferably less than 75% of silica, as a percentage by mass;

the particles (b) made of a glass-ceramic precursor glass and/or the particles (b) made of glass-ceramic have the following chemical composition, as percentages by mass based on the oxides and for a total of more than 95%, more than 98%, preferably substantially 100%:

$SiO_2$: 45%-75%, and $Al_2O_3$: 5%-40%, and $CaO$+$MgO$+$Li_2O$: 3%-30%, nucleating agents, expressed in an oxide form: 0.1%-20%;

the amount of nucleating agents is preferably greater than 1% and/or less than 10%, preferably less than 5%;

said nucleating agents are preferably selected from $TiO_2$, $ZrO_2$, $P_2O_5$ and mixtures thereof, the amount of particles (c) of hydraulic cement is preferably less than 1%, preferably less than 0.5%;

the amount of particles (c) of hydraulic cement is preferably substantially zero;

the total amount of particles (a), (b) and (c) is preferably greater than 95%, preferably greater than 97%, preferably greater than 98%, preferably greater than 99%, the balance being composed preferably of other oxides and/or surfactants and/or anti-segregation adjuvants and/or fibers;

the unshaped product comprises a surfactant, preferably between 0.075% and 1% of a surfactant;

the surfactant is a modified polycarboxylate ether;

the unshaped product preferably comprises an anti-segregation adjuvant, preferably in an amount of between 0.05% and 0.5% of the mass of the unshaped product;

in one embodiment, the unshaped product comprises fibers, preferably organic fibers, preferably between 0.01% and 0.06%, preferably between 0.01% and 0.03%;

in one embodiment, the unshaped product does not contain fibers;

the unshaped product is moistened so as to give a repair product, by the addition thereto of an amount of water of preferably greater than 8%, preferably greater than 9% and/or less than 13%, less than 12%, by mass relative to the mass of said unshaped product.

Preferably, at least in this first embodiment, the product Repair Hot Bottom AZS is used, sold by Saint-Gobain Sefpro.

In a second preferred embodiment, particularly when the target filling region is located at a wall of the tank in the furnace, the unshaped product is selected from Hot Overcoat AZS and Hot Overcoat Chrom50, which are sold by Saint-Gobain Sefpro.

The repair product may be brought to the target filling region by any technique known to the skilled person. The repair product is preferably pumped by means of a pump producing a suction pressure of preferably less than or equal to 180 bar and is preferably conveyed to the target filling region by means of a water-cooled lance. Passages, made by piercing, for example, may be installed to allow the cooled lance to be positioned for this purpose.

In one embodiment, the repair product is ready to use, in other words already moistened. The rise velocity of the repair product may advantageously be increased and/or the number or capacity of the pumps reduced.

The repair product is preferably run into the target filling region.

Duration of Coating

The inventors have found that the rise velocity of greater than or equal to 3 mm/min must be attained rapidly after the repair product has started to be introduced into the target filling region.

When the target filling region is in a wall of the tank, the dimensions of the bottom are reduced such that the product starts to rise a short time after it has begun to be introduced into the target filling region. The coating of the bottom of the target filling region therefore lasts conventionally less than 14 minutes. The condition of a coating duration which lasts less than 14 minutes is therefore not limiting in practice for a target filling region in a tank wall.

Conversely, when the bottom of the target filling region is defined by the floor, its horizontal surface may be extended, such that the coating step during which the repair product gradually covers the bottom may have a long duration.

During the coating step, though, there are portions of the bottom which are not covered with repair product, and portions of the bottom which are covered with repair product. In these latter portions, however, the rise velocity of the repair product is very low, or even zero, and, at a constant feed rate of repair product, is lower than the rise velocity during the filling step. The reason is that the repair product, in the absence of lateral constraint, tends to flow by gravity, rather than to rise in the target filling region, particularly if the repair product is self-flowable. If the coating step lasts more than 14 minutes, the inventors have found that it can lead to heterogeneity in the sintered product, which may limit the lifetime of said product.

The coating duration, in other words the duration of the coating step, is preferably less than 12 minutes, preferably less than 11 minutes, preferably less than 10 minutes, preferably less than 9 minutes, preferably less than 8 minutes or even less than 7 minutes, or even less than 6 minutes, and/or greater than 15 seconds, preferably greater than 20 seconds.

When the target filling region belongs to the floor of the tank, the coating duration, expressed in minutes, is preferably less than 0.6 min/m²*S, preferably less than 0.5 min/m²*S, preferably less than 0.4 min/m²*S, preferably less than 0.3 min/m²*S, where S is the surface area of the bottom of the target filling region, expressed in m².

To reduce the coating duration, all that need be done is to reduce the surface area of the target filling region or to increase the rate at which the repair product is introduced into the target filling region.

Preferably in step b), the entry of the repair product is located at least one meter from the center of the bottom of the target filling region, preferably substantially at the center of the bottom of the target filling region.

In step c), the target filling region is filled.

Step c) preferably follows step b) immediately, in that there is no interruption in the feed of repair product between these steps. The feed rate is preferably identical and constant during these two steps.

Preferably in step c), the entry of the repair product is located at least one meter from the center of the bottom of the target filling region, preferably substantially at the center at the bottom of the target filling region.

During step c), the entire surface of the repair product present in the target filling region rises.

Rise Velocity

The inventors observed that after rapid coating, a rise velocity of greater than or equal to 3 mm/min throughout the filling step very substantially improves the properties of the region repaired. Without being tied to this theory, the inventors explain this result through a notable homogeneity in the sintered product, in other words the product resulting from the sintering of the repair product.

In one embodiment, more particularly if the target filling region belongs to the floor of the tank, the difference between the maximum rise velocity and the minimum rise velocity during the filling step is less than 15 mm/min, preferably less than 10 mm/min, preferably less than 8 mm/min, preferably less than 5 mm/min, preferably less than 3 mm/min, preferably substantially zero. A small difference, preferably a substantially constant rise velocity, further improves the homogeneity of the sintered product.

Throughout the filling step c), said rise velocity is preferably greater than 4 mm/min, preferably greater than 5 mm/min, preferably greater than 6 mm/min, preferably greater than 7 mm/min, preferably greater than 8 mm/min, preferably greater than 9 mm/min, preferably greater than 10 mm/min, and preferably less than 80 mm/min, preferably less than 70 mm/min, preferably less than 60 mm/min, preferably less than 50 mm/min, preferably less than 40 mm/min, preferably less than 30 mm/min.

In one embodiment, particularly if the target filling region belongs to the floor of the tank, the rise velocity is preferably still less than 80 mm/min, preferably less than 70 mm/min, preferably less than 60 mm/min, preferably less than 50 mm/min, preferably less than 45 mm/min, preferably less than 40 mm/min, preferably less than 35 mm/min, preferably less than 30 mm/min. Advantageously, these conditions offer the best tradeoff between the properties of the repair product after sintering and the observance of the constraints linked to the repair workshop, particularly the space constraints which limit the volume of the pumps used for bringing the repair product to the target filling region, and/or the number of these pumps, and also the surface area of the target filling regions.

Preferably, in step b) and/or in step c), preferably in step b) and in step c), the repair product is introduced into the target filling region at a rate of greater than 0.02 m³/min, preferably greater than 0.03 m³/min, preferably greater than 0.05 m³/min, preferably greater than 0.10 m³/min and/or less than 0.60 m³/min, preferably less than 0.50 m³/min, preferably less than 0.40 m³/min, preferably less than 0.30 m³/min.

Hot Repair

A method according to the invention is used for the hot repair of a tank initially containing a bath of molten glass in contact with the target repair region. In one embodiment, the method comprises, prior to steps a) to c), the following prior steps:

1) at least partially draining the molten glass from the tank, in order to expose said target repair region;
2) preferably, rinsing said target repair region;
3) reducing the temperature in the furnace.

The method subsequently comprises the following final steps:

4) implementing steps a) to c);
5) preferably, increasing and maintaining the temperature of the furnace between 900° C. and 1400° C. so as to sinter the repair product;
6) introducing a glass composition for melting into the tank and increasing the temperature of the furnace to an operating temperature leading to the melting of said composition.

The prior steps enable access to the target repair region, in other words exposure of this region.

In step 1), then, the glass is drained, meaning that the tank of the furnace is emptied at least partially, preferably substantially entirely, of the molten glass it contains, until the target repair region is uncovered. Draining may be carried out by any technique known to the skilled person.

It is possible, for example, to cool the molten glass by means of water lances and evacuate the cooled glass from the furnace and/or to evacuate the molten glass from the furnace, through holes made in the floor or through holes resulting from the demounting of one or more electrodes.

In step 2), which is optional but preferred, the target repair region is rinsed, i.e., rid of the residues of glass. A product suitable for increasing the fluidity of glass is preferably sprayed at least on the target repair region. The glass thus fluidified is discharged more readily from the furnace, particularly in the case of removal of molten glass. The fluidification product is preferably selected from sodium sulfate, sodium carbonate, sodium hydroxide and mixtures thereof.

In step 3), the temperature in the furnace is reduced.

The temperature in the furnace is preferably reduced to a temperature of greater than 300° C., preferably greater than 400° C., preferably greater than 500° C., preferably greater than 600° C., preferably greater than 700° C., preferably greater than 800° C., preferably greater than 900° C., and preferably less than 1350° C., preferably less than 1300° C.

In one embodiment, the repair product used in steps b) and c) contains a hot binder, and in step 3), the temperature in the furnace is reduced to a temperature at which the hot binder is not in the solid state. More particularly, when the hot binder is a glass-ceramic or a glass, more particularly a glass-ceramic precursor glass, the temperature in the furnace is reduced to a temperature which remains greater than the glass transition temperature of the glassy phase of the hot binder. The glass transition temperature of the glassy phase of the hot binder is dependent on the nature of the hot binder. The hot binder is preferably selected such that the glass transition temperature of its glassy phase is between 600° C. and 1350° C., preferably between 900° C. and 1350° C., preferably between 1000° C. and 1300° C., preferably between 1150° C. and 1250° C.

In step 4), the repair product is installed according to steps a) to c).

In step 5), which is optional, the furnace is maintained at a temperature of between 900° C. and 1400° C., preferably between 1250° C. and 1400° C., preferably between 1300° C. and 1400° C., so as to allow the repair product to sinter, preferably for a time greater than 8 hours, preferably greater than 10 hours and preferably less than 15 hours.

When the repair product contains particles (b) of glass-ceramic precursor glass, the furnace is preferably maintained at a temperature which promotes the nucleation and the growth of microcrystallites. The skilled person knows how to determine the range of temperatures permitting this nucleation and this growth.

In step 6), normal operation of the furnace is resumed: A glass composition for melting is introduced into the furnace and the furnace temperature is increased to its operating temperature.

EXAMPLES

The non-limiting examples which will follow are given for the purpose of illustrating the invention.

Three examples were carried out with the same repair product, with the rise velocity of the repair product being different.

To manufacture the repair product, the unshaped product Repair Hot Bottom AZS, sold by Saint-Gobain Sefpro, was mixed, in a kneader having a rotating blade and a fixed vessel, with 11% of water, as a percentage based on the unshaped product, for 5 minutes.

The composition by mass of this unshaped product is as follows, based on the mass of the oxides in the unshaped product:

$Al_2O_3$: 51.8%
$SiO_2$: 16.8%
$ZrO_2$: 28.7%
other oxides: 2.7%, consisting of CaO, $Na_2O$, $K_2O$ and MgO, introduced by the glass, and also impurities.

For each example, 50 kg of repair product are prepared. This repair product is self-flowable under hot conditions.

For each example, a flat-bottom compartment having a length of 300 mm and a width of 250 mm, giving a total surface area of 0.075 $m^2$, and a depth of 150 mm was produced in an electric furnace, by means of refractory bricks made of ER1681.

The furnace was started up so as to attain a temperature of 1300° C., the rate of temperature rise being 100° C./h.

The repair product was run into the compartment maintained at 1300° C. with the aid of a water-cooled metal lance introduced through an opening made in one of the side walls of the electric furnace.

For example 1, outside the invention, the repair product was introduced in the form of fine successive superposed layers, until the compartment was filled. Each layer was produced by passing the lance back and forth in order to spread the repair product in the form of adjacent rows.

For examples 2 and 3, according to the invention, the lance was held stationary and the repair product was run continuously, with the level of the repair product permanently increasing above any point in the bottom of the compartment after the coating step. The rise velocity was substantially constant.

When the compartment had been filled, the temperature was maintained at 1300° C. for 10 hours. The temperature was subsequently reduced gradually, at a rate of 100° C./h. The sintered product within the compartment was recovered, observed and then cut up.

The inventors consider that this test effectively reproduces the conditions encountered during repair of a furnace floor.

The open porosity was measured by hydrostatic weighing.

The cold compressive strength was measured by means of an LR150K press, sold by Ametek-Lloyd, on cylinders with a diameter of 30 mm and a height of 30 mm, taken from the sintered product.

Table 1 below gives the filling velocities and the results obtained.

TABLE 1

|  | Example 1 | Example 2 | Example 3 |
|---|---|---|---|
| Duration of coating step (min) | 5 | 0.25 | 0.8 |
| Rise velocity (mm/min) | 2 | 40 | 12 |
| Open porosity (%) | 42 | 29 | 25 |
| Cold compressive strength (MPa) | 28 | 56 | 65 |

Observation of the sintered product realized according to example 1 shows that it exhibits strata stacked one atop another and a large number of macropores.

Observation of the sintered product realized according to example 2 shows that, in contrast to example 1, it exhibits a uniform texture, an open porosity of 29%, 31% less than that of the sintered product realized according to example 1 (of 42%), and a compressive strength of 56 MPa, 2 times greater than that of the sintered product realized according to example 1 (of 28 MPa).

Observation of the sintered product realized according to example 3 shows that, in contrast to example 1, it exhibits a uniform texture, an open porosity of 25%, 40% less than that of the sintered product realized according to example 1 (of 42%), and a compressive strength of 65 MPa, 2.3 times greater than that of the sintered product realized according to example 1 (of 28 MPa).

These notable features make it possible to increase the lifetime of the region repaired, and hence the lifetime of the furnace tank.

These examples thus demonstrate the highly advantageous effect of controlling the coating duration and the rise velocity in order to ensure continuous progression of the repair product in the target filling region.

As it clearly appears at present, the invention thus provides a method for repairing a tank of a glass-melting furnace, and more particularly a region of the floor of this tank, this method allowing the lifetime of the furnace tank to be increased.

A method according to the invention is particularly advantageous for repairing a large-sized target repair region, and more particularly the floor of the furnace.

The present invention is of course not limited to the embodiments described, which are given as non-limiting, illustrative examples.

The invention claimed is:

1. A method for hot repair of a region of a tank of a glassmaking furnace, referred to as target repair region, by means of a repair product, said method comprising the following steps:

at a temperature greater than 300° C.:

a) defining a receiving space in the target repair region, referred to as "target filling region", the target filling region comprising a bottom;

b) coating said bottom, the duration of coating, from the start of the introduction of the repair product into the target filling region to the moment when said bottom is completely covered by repair product, being less than 14 minutes; and c) filling the target filling region with the repair product, the rise velocity of the repair product in the target filling region being, at any moment during said filling step, greater than or equal to 3 mm/min.

2. The method as claimed in claim 1, wherein the rise velocity varies, during said filling step, between a minimum velocity and a maximum velocity, the difference between said maximum rise velocity and said minimum rise velocity being less than 15 mm/min.

3. The method as claimed in claim 1, wherein the rise velocity of the repair product is, at any moment during said filling step c), greater than 7 mm/min and/or wherein the duration of the coating step b) is less than 10 minutes.

4. The method as claimed in claim 3, wherein the rise velocity of the repair product is, at any moment during said filling step, greater than 12 mm/min and/or wherein the duration of the coating step b) is less than 8 minutes.

5. The method as claimed in claim 1, wherein the target filling region has a surface area of less than or equal to 25 $m^2$.

6. The method as claimed in claim 1, wherein the target filling region has a surface area of greater than or equal to 3 $m^2$ and less than 16 $m^2$.

7. The method as claimed in claim 1, wherein, in step b) and in step c), the repair product is introduced into the target filling region at a rate greater than 0.02 $m^3$/min and less than 0.60 $m^3$/min.

8. The method as claimed in claim 1, wherein the rise velocity of the repair product is, at any moment during said filling step, less than 80 mm/min.

9. The method as claimed in claim 1, wherein, during the filling step, the repair product is conveyed to the target filling region by pumping.

10. The method as claimed in claim 9, wherein the repair product is conveyed to the target filling region at a suction pressure of less than or equal to 180 bar.

11. The method as claimed in claim 1, wherein the target filling region is defined by the surface of the tank in the target repair region and/or by one or more compartmentalization walls emplaced in the target repair region.

12. The method as claimed in claim 1, comprising a step a) in which the target repair region is divided into a plurality of compartments, then a plurality of cycles of steps b) and c) in order to fill each of said compartments.

13. The method as claimed in claim 1, wherein the target filling region is at least partly defined by the floor of the tank.

14. The method as claimed in claim 1, said tank containing molten glass, said method comprising the following steps:

1) at least partially draining the molten glass from the tank, in order to expose said target repair region;

2)—reducing the temperature in the furnace;

3) Implementing said steps a) to c); and

4) Introducing a glass composition for melting into the tank and increasing the temperature of the furnace to an operating temperature leading to the melting of said composition.

15. The method as claimed in claim 14, said method further comprising the following steps:

rinsing said target repair region between steps 1) and 2).

16. The method as claimed in claim 14, said method further comprising the following steps:

increasing and maintaining the temperature of the furnace between 900° C. and 1400° C. so as to sinter the repair product between steps 3) and 4).

17. The method as claimed in claim 1, wherein the repair product is the result of moistening an unshaped product by adding thereto an amount of water of greater than 8%, by mass relative to the mass of said unshaped product.

\* \* \* \* \*